(12) United States Patent
Mastie et al.

(10) Patent No.: US 9,518,623 B2
(45) Date of Patent: Dec. 13, 2016

(54) POWERTRAIN AXLE ROTATIONAL DISCONNECT ASSEMBLY

(71) Applicant: BorgWarner Inc., Auburn Hills, MI (US)

(72) Inventors: Joseph D. Mastie, Belleville, MI (US); Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/642,878

(22) Filed: Mar. 10, 2015

(65) Prior Publication Data

US 2016/0265601 A1    Sep. 15, 2016

(51) Int. Cl.
| | |
|---|---|
| F16D 27/14 | (2006.01) |
| F16D 27/01 | (2006.01) |
| F16D 11/08 | (2006.01) |
| F16D 27/00 | (2006.01) |
| F16D 27/118 | (2006.01) |

(52) U.S. Cl.
CPC .............. *F16D 27/14* (2013.01); *F16D 11/08* (2013.01); *F16D 27/01* (2013.01); *F16D 27/004* (2013.01); *F16D 27/118* (2013.01)

(58) Field of Classification Search
CPC ................................ F16D 11/08; F16D 27/108
See application file for complete search history.

(56) References Cited

U.S. PATENT DOCUMENTS

| | | | | | |
|---|---|---|---|---|---|
| 2,951,569 | A | * | 9/1960 | Tompkins et al. | 192/84.2 |
| 4,185,722 | A | * | 1/1980 | Palmer et al. | 192/18 B |
| 5,765,671 | A | * | 6/1998 | Endo | B60L 11/1874 |
| | | | | | 192/48.2 |
| 5,827,148 | A | * | 10/1998 | Seto | B60L 11/18 |
| | | | | | 477/15 |
| 7,461,569 | B2 | * | 12/2008 | Bianchi | B60K 17/28 |
| | | | | | 74/335 |
| 2003/0019711 | A1 | * | 1/2003 | Nekado et al. | 192/84.96 |
| 2008/0093570 | A1 | * | 4/2008 | Martin | 251/16 |
| 2013/0334000 | A1 | * | 12/2013 | Gerauer et al. | 192/69.7 |

FOREIGN PATENT DOCUMENTS

JP    WO2013/157316    * 10/2013

* cited by examiner

*Primary Examiner* — Mark Manley
(74) *Attorney, Agent, or Firm* — BrooksGroup

(57) ABSTRACT

An axle disconnect assembly for translating rotational torque between an output shaft and an axle shaft of a vehicle driveline; including: disconnect housing and a clutch supported therein. The clutch is disposed in selective torque translating relationship between the output shaft and the axle shaft, and is movable between: an engaged configuration wherein torque is translated between the output shaft and the axle shaft; and a disengaged configuration wherein torque is interrupted between the shafts. An electromagnetic actuator is provide and has a slider selectively movable between a first stable position and a second stable position. The actuator is disposed in force translating relationship with the clutch such that movement from one stable position to the other stable position causes corresponding movement of the clutch between the configurations so as to selectively translate rotational torque between the output shaft and the axle shaft.

16 Claims, 5 Drawing Sheets

POWERTRAIN AXLE ROTATIONAL DISCONNECT ASSEMBLY

BACKGROUND OF INVENTION

1. Field of Invention

The present invention relates, generally, to automotive powertrain systems and, more specifically, to an axle disconnect assembly for powertrain systems.

2. Description of the Related Art

Conventional automotive vehicles known in the art include a powertrain system in rotational communication with one or more drivelines. Typically, the vehicle includes a pair of drivelines, each defined by a respective pair of opposing wheels. The powertrain system includes a propulsion system adapted to generate and selectively translate rotational torque to one or more of the wheels so as to drive the vehicle. To that end, in conventional automotive powertrain systems, the propulsion system is typically realized as an internal combustion engine in rotational communication with a transmission. The engine generates rotational torque which is selectively translated to the transmission which, in turn, translates rotational torque to one or more of the drivelines. The transmission multiplies the rotational speed and torque generated by the engine through a series of predetermined gear sets, whereby changing between gear sets enables the vehicle to travel at different vehicle speeds for a given engine speed.

In so-called "four-wheel-drive" or "all-wheel-drive" powertrain systems, both drivelines are used to drive the vehicle. To that end, all wheel drive powertrain systems typically include a transfer case disposed in rotational communication with the transmission and adapted to split rotational torque between the drivelines. The transfer case may be spaced from the transmission, or may be integrated with the transmission. Where the transfer case is spaced from the transmission, a driveshaft is used to translate rotational torque from the transmission to the transfer case. Driveshafts are also typically used to connect the transfer case to each respective driveline. Conventional drivelines are commonly realized by a differential assembly adapted to receive rotational torque from the transfer case and subsequently split rotational torque between opposing wheels. To that end, each driveline also typically includes a pair of continuously-variable joints disposed in torque translating relationship with the differential and each respective opposing wheel.

Depending on the specific configuration of the powertrain system, the percentage of torque split between the drivelines may vary. Moreover, depending on the vehicle application, the transfer case and/or driveline(s) may be configured to interrupt rotational torque to one of the drivelines under certain operating conditions. Specifically, the powertrain system may be configured such that the vehicle can be selectively operated in "two-wheel-drive" or in "four-wheel-drive". Moreover, the powertrain system may be configured to automatically and continuously control how much rotational torque is sent to each driveline. Thus, the powertrain system may be configured to send a higher percentage of available torque to one of the drivelines under certain vehicle operating conditions, and a lower percentage of available torque to the same driveline under different vehicle operating conditions. By way of non-limiting example, the powertrain system may be configured such that 80% of torque is sent to a front driveline and 20% of torque is sent to a rear driveline until there is a loss of traction or wheel spin, whereby the powertrain subsequently adjusts torque split such that 50% of torque is sent to each driveline.

Depending on the vehicle application, rotational torque may only be required at both drivelines relatively infrequently. Thus, the vehicle may be designed to operate primarily in "two-wheel-drive" so as to minimize parasitic loss and optimize powertrain system efficiency. Moreover, optimizing how torque is split between drivelines can lead to significant improvements in vehicle efficiency. Thus, in order to decrease parasitic losses in the powertrain system, it is advantageous to selectively disconnect one or more driveshafts and/or continuously-variable joints from rotational communication with the transfer case, transmission, and/or differentials. To that end, rotational disconnects are used to selectively interrupt rotation between powertrain system components, whereby a controller and an actuator are typically used to selectively control the rotational disconnect. The controller energizes the actuator which, in turn, engages the rotational disconnect so as to couple (or, decouple) the powertrain system components.

Each of the components and systems of the type described above must cooperate to effectively and selectively translate rotational torque to the driven wheels of the vehicle. In addition, each of the components and systems must be designed not only to facilitate improved performance and efficiency, but also so as to reduce the cost and complexity of manufacturing vehicles. While powertrain rotational disconnect systems known in the related art have generally performed well for their intended use, there remains a need in the art for an axle disconnect assembly that has superior operational characteristics and a reduced overall packaging size, and, at the same time, that reduces the cost and complexity of manufacturing vehicles that operate with high efficiency under a number of different driving conditions.

SUMMARY OF THE INVENTION

The present invention overcomes the disadvantages in the related art in an axle disconnect assembly for use in selectively translating rotational torque between an output shaft and an axle shaft of a vehicle driveline. The axle disconnect assembly includes a disconnect housing, and a clutch assembly supported in the disconnect housing. The clutch assembly is disposed in selective torque translating relationship between the output shaft and the axle shaft, and is movable between: an engaged configuration wherein rotational torque is translated between the output shaft and the axle shaft; and a disengaged configuration wherein rotational torque is interrupted between the output shaft and the axle shaft. The axle disconnect assembly further includes an electromagnetic actuator having a slider that is selectively movable between a first stable position and a second stable position. The actuator is disposed in force translating relationship with the clutch assembly such that movement of the slider from one of the stable positions to the other of the stable positions causes corresponding movement of the clutch assembly between the configurations so as to selectively translate rotational torque between the output shaft of the driveline and the axle shaft of the driveline.

In this way, the axle disconnect assembly of the present invention significantly improves the performance of vehicle powertrain systems by enabling simple and space-efficient implementation of selective rotational torque interruption. More specifically, those having ordinary skill in the art will appreciate that the axle disconnect assembly of the present invention is configured such that the coil of the actuator need not be continually supplied with electrical current to maintain the relative clutch assembly configuration. Moreover, it will be appreciated that the electromagnetic actuator can be configured so as to significantly minimize the overall packaging size of the axle disconnect assembly while, at the same time, affording significant improvements in vehicle powertrain functionality. Further, the present invention can be used in connection with a number of different types of powertrain systems, and in a number of different ways. Further still, the present invention reduces the cost and complexity of manufacturing vehicles that have superior operational characteristics, such as high efficiency, reduced weight, component packaging, component life, and vehicle drivability.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
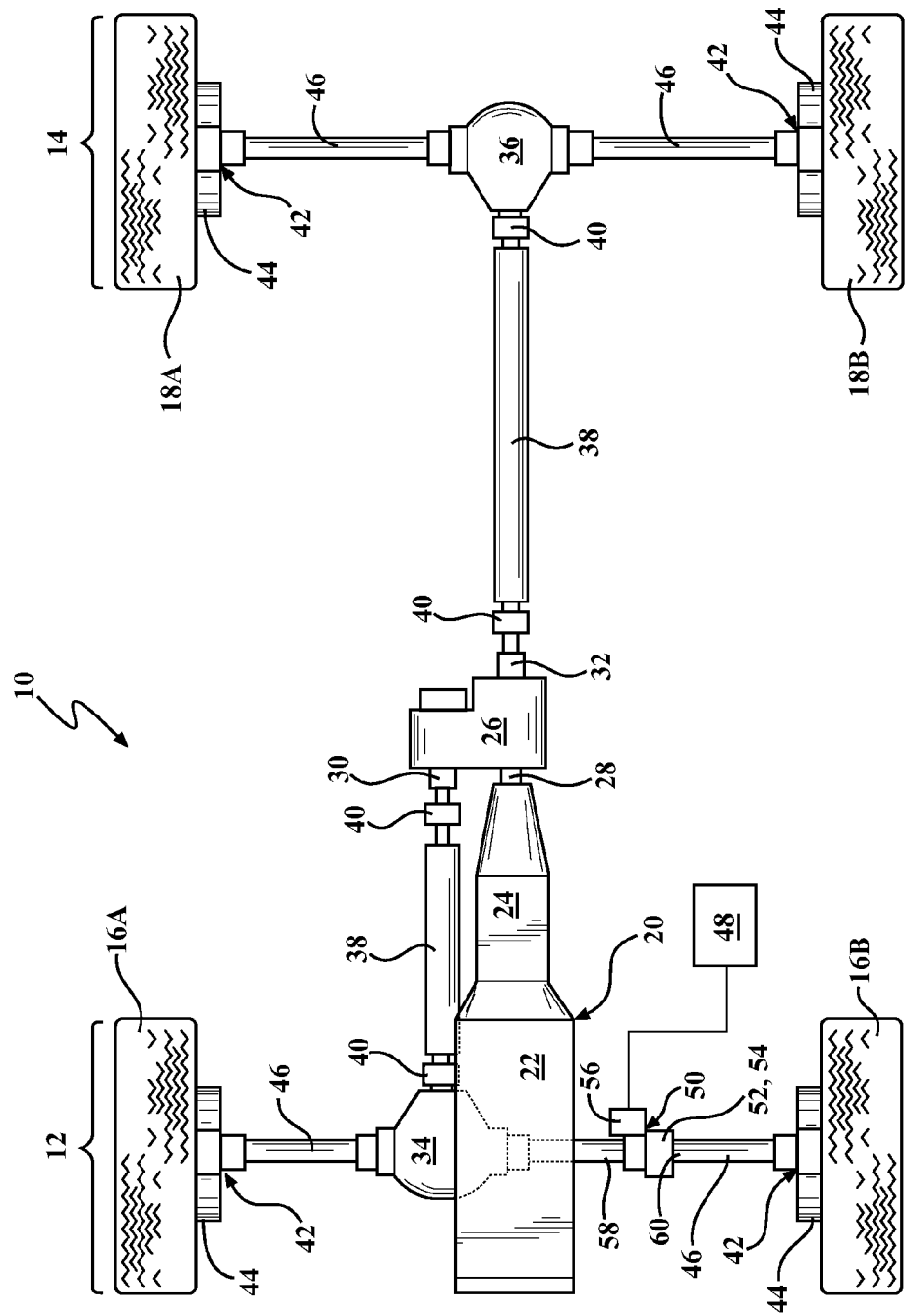
FIG. 1 is a schematic plan view of a vehicle powertrain system showing an output shaft, an axle shaft, and an axle disconnect assembly according to the present invention.

Referring now to the figures, where like numerals are used to designate like structure unless otherwise indicated, a vehicle powertrain system is schematically illustrated at 10 in FIG. 1. The powertrain system 10 includes a first driveline 12 and a second driveline 14. The first driveline 12 includes a first pair of opposing wheels 16A, 16B, and the second driveline 14 includes a second pair of opposing wheels 18A, 18B. Those having ordinary skill in the art will recognize this as a conventional "four wheeled" vehicle design commonly used in automotive applications. However, as will be appreciated from the subsequent discussion below, the vehicle could include any number of drivelines with any suitable number of wheels without departing from the scope of the present invention. The powertrain system 10 also includes a propulsion system 20 that acts to generate and translate rotational torque the first and second drivelines 12, 14. Each of these components and systems will be described in greater detail below.

In the representative example illustrated in FIG. 1, the propulsion system 20 is realized as a conventional internal combustion engine 22 disposed in rotational communication with a transmission 24. The engine 22 generates rotational torque which is selectively translated to the transmission 24 which, in turn, multiplies the rotational speed and torque generated by the engine 22. Those having ordinary skill in the art will appreciate that transmission 24 can be designed in several different ways and, as such, can be disposed in rotational communication with the engine 22 in any suitable way depending on the application. By way of non-limiting example, the transmission 24 could include a gear set (not shown, but generally known in the art) that is either manually or automatically actuated, or the transmission 24 could be continuously-variable. Moreover, while FIG. 1 shows the engine 22 and transmission 24 operatively attached to one another, it will be appreciated that the transmission 24 could spaced from the engine 22 so as to improve weight distribution of the vehicle without departing from the scope of the present invention. Further, it will be appreciated that the propulsion system 20, engine 22, and/or transmission 24 could be of any suitable type, configured in any suitable way sufficient to generate and translate rotational torque to the drivelines 12, 14, without departing from the scope of the present invention. By way of non-limiting example, the propulsion system 20 could employ what is commonly referred to in the related art as a "hybrid engine," whereby rotational torque translated to the drivelines 12, 14 is generated by the engine 22 as well as by one or more electric motors (not shown, but generally known in the art). Similarly, the powertrain system 10 could omit an internal combustion engine 22 altogether, such as in a so-called "electric vehicle powertrain" wherein the propulsion system 20 employs one or more electric motors to drive the vehicle (not shown, but generally known in the related art).

The powertrain system 10 also includes a transfer case 26 disposed in rotational communication with the transmission 24. The transfer case 26 is configured to split rotational torque from the transmission 24 between the drivelines 12, 14, as described in greater detail below. In the representative embodiment illustrated herein, the transfer case 26 is situated in-line with the transmission 24 and is disposed in rotational communication therewith via a transmission output shaft 28. However, those having ordinary skill in the art will appreciate that the transfer case 26 and transmission 24 could be disposed in rotational communication with each other in a number of different ways without departing from the scope of the present invention. By way of non-limiting example, the transfer case 26 could be integrated with the transmission 24, or the transmission 24 and transfer case 26 could be offset from one another and could be in rotational communication via an intermediate shaft with one or more universal joints (not shown, but generally known in the art), thereby enabling additional flexibility with respect to weight distribution and packaging of the drivetrain 10.

The transfer case 26 includes a first output 30 and a second output 32 disposed in torque translating relationship with the first driveline 12 and the second driveline 14, respectively. In the representative embodiment illustrated herein, each of the drivelines 12, 14 includes a respective differential assembly 34, 36, a driveshaft 38, and one or more universal joints 40. The driveshaft 38 and universal joints 40 connect the outputs 30, 32 of the transfer case 26 to the respective differentials 34, 36 of the drivelines 12, 14. Thus, the first differential assembly 34 is disposed in torque translating relationship with the first output 30 of the transfer case 26 and translates rotational torque to the first pair of wheels 16A, 16B; and the second differential assembly 36 is disposed in torque translating relationship with the second output 32 of the transfer case 26 and translates rotational torque to the second pair of wheels 18A, 18B. Each of the wheels 16A, 16B, 18A, 18B is mounted to a respective wheel hub 42 configured to facilitate rotation in operation. Similarly, the wheel hubs 42 are each supported by a respective knuckle bracket 44 mounted to the vehicle (mounting not shown in detail). The knuckle bracket 44 may be mounted directly to the vehicle, or may be mounted to another vehicle component, such as a suspension arm or shock absorber strut assembly (not shown, but generally known in the art). In order to translate rotation to the wheels 16A, 16B, 18A, 18B so as to drive the vehicle in operation, each of the drivelines 12, 14 also includes a pair of continuously-variable joints 46. The continuously-variable joints 46 translate rotational torque from the differentials 34, 36 to the wheels 16A, 16B, 18A, 18B. However, those having ordinary skill in the art will appreciate that the drivelines 12, 14 could be configured differently, with or without the use of continuously-variable joints 46, without departing from the scope of the present invention. By way of non-limiting example, it is conceivable that the drivelines 12, 14 could be realized by live axles with integrated hubs (not shown, but generally known in the art).

As will be appreciated from the subsequent description below, the transfer case 26 could be of any suitable type or configuration sufficient to selectively translate rotational torque between the transmission 24 and the drivelines 12, 14 without departing from the scope of the present invention. In traditional "four-wheel-drive" powertrain systems 10, as illustrated in FIG. 1, the transfer case 26 translates rotational torque to the second driveline 14 when the vehicle is operated in "rear-wheel-drive mode," and the transfer case 26 translates rotational torque to both the first and second drivelines 12, 14 when the vehicle is operated in "four-wheel-drive mode". In certain applications, the vehicle driver can decide whether to operate in "two-wheel-drive" or "four-wheel-drive" and can select between the modes using an input control (not shown, but generally known in the art). Alternatively, a controller 48 can be used to automatically move the transfer case 26 between "two-wheel-drive" and "four-wheel-drive" without driver interaction. In other applications, four-wheel-drive powertrain systems 10 are configured as so-called "full-time all-wheel-drive" powertrain systems 10, whereby the transfer case 26 always translates at least some rotational torque to both drivelines 12, 14. The amount of torque translated to each of the drivelines 12, 14 can be allocated according to a fixed ratio, such as via predetermined gearing (not shown, but generally known in the art), or torque can be selectively (or, continuously) adjustable between the drivelines 12, 14 via one or more clutch assemblies (not shown, but generally known in the art).

Irrespective of the specific configuration or type of transfer case 26, it is advantageous to minimize or eliminate parasitic loss, whereby eliminating unnecessary rotation and/or torque translation increases the overall efficiency of the powertrain system 10. To that end, the powertrain system 10 includes an axle disconnect assembly, generally indicated at 50, configured to selectively interrupt rotational torque translation between the assigned wheel 16A and the assigned differential 34, 36, as described in greater detail below. In the representative embodiment illustrated throughout the figures, the axle disconnect assembly 50 is assigned to one of the wheels 16A of the first driveline 12. Here, the first differential 34 may be configured as a so-called "open differential" such that translation of rotational torque is effectively interrupted to both of the first pair of wheels 16A, 16B when the axle disconnect assembly 50 interrupts translation of rotational torque to the assigned wheel 16A.

As noted above, the powertrain system 10 and/or drivelines 12, 14 could be configured in a number of different ways. As such, while a single axle disconnect assembly 50 is shown in FIG. 1, those having ordinary skill in the art will appreciate that any suitable number of axle disconnect assemblies 50 could be utilized without departing from the scope of the present invention. By way of non-limiting example, where the first differential 34 is configured as a so-called "locking differential" or a "limited slip differential," it is conceivable that a pair of axle disconnect assemblies 50 could be utilized; one assigned to each wheel 16A, 16B of the first driveline 12. Moreover, while the axle disconnect assembly 50 is shown in FIG. 1 as facilitating torque translation interruption between the assigned wheel 16A and the first differential 34 via the continuously-variable joint 46, it is conceivable that one or both of the drivelines 12, 14 could omit a traditional differential 34, 36 and could utilize a clutch assembly to split rotational torque between opposing wheels (not shown, but generally known in the related art).

Referring now to FIGS. 2A-3B, the axle disconnect assembly 50 of the present invention includes a disconnect housing 52, a clutch assembly, generally indicated at 54, and an electromagnetic actuator, generally indicated at 56. The axle disconnect assembly 50 is adapted for use in selectively translating rotational torque between an output shaft 58 and an axle shaft 60 of an assigned wheel 16A of an assigned vehicle driveline 12. As noted above, the axle disconnect assembly 50 can be used in a number of different ways and in a number of different powertrain systems 10. As such, it will be appreciated that the specific configuration of the shafts 56, 58 described herein may vary without departing from the scope of the present invention. Specifically, while the shafts 58, 60 are described in greater detail below as being integrated with the first differential 34 and the continuously-variable joint 46, respectively, of the assigned wheel 16A of the assigned driveline 12, those having ordinary skill in the art will appreciate that the output shaft 58 and/or axle shaft 60 could be of any suitable type or configuration, defined by any suitable part of either driveline 12, 14 of the powertrain system 10, without departing from the scope of the present invention.

As noted above, the axle disconnect assembly 50 includes a clutch assembly 54 and an electromagnetic actuator 56. The clutch assembly 54 is disposed in selective torque translating relationship between the axle shaft 56 and the output shaft 58 and is selectively movable between: an engaged configuration 54A wherein rotational torque is translated between the axle shaft 56 and the output shaft 58 (see FIGS. 2A and 3A), and a disengaged configuration 54B wherein rotational torque is interrupted between the axle shaft 56 and the output shaft 58 (see FIGS. 2B and 3B). As is described in greater detail below, the electromagnetic actuator 56 is adapted to selectively move the clutch assembly 54 between the configurations 54A, 54B.

As noted above, the axle disconnect assembly 50 cooperates with the output shaft 58 and the axle shaft 60 to facilitate selectable rotational torque interruption to the assigned driveline 12. To this end, and as is explained in greater detail below, the output shaft 58 is realized as a jackshaft extending between the disconnect assembly 50 and the first differential 34 of the first driveline 12. However, those having ordinary skill in the art will appreciate that the output shaft 58 could be integrated directly with or otherwise be defined by the differential 34, without the use of a discrete jackshaft, without departing from the scope of the present invention. The output shaft 58 includes a support shaft portion 62, a toothed portion 64, and a mid shaft portion 66 extending between the support shaft portion 62 and the toothed portion 64. The toothed portion 64 cooperates with the clutch assembly 54, as described in greater detail below. The support shaft portion 62 is supported in the disconnect housing 52 via an output shaft bearing 68. The output shaft 58 also includes a pilot recess 70 defined adjacent to the toothed portion 64 that accommodates a pilot bearing 72 therein. The pilot bearing 72, in turn, supports the axle shaft 60 and acts to help concentrically align the axle shaft 60 and the output shaft 58, as described in greater detail below. As shown in FIGS. 2A-3B, the output shaft bearing 68 and the pilot bearing 72 are realized as conventional ball bearings. However, those having ordinary skill in the art will appreciate that any suitable type or number of bearings could be utilized without departing from the scope of the present invention.

As noted above, the axle shaft 60 of the continuously-variable joint 46 is disposed in selective torque translating relationship with the first differential 34 of the first driveline 12 via the axle disconnect assembly 50. To that end, the axle shaft 60 includes a thrust portion 74, a splined end portion 76 extending from the thrust portion 74, and a pilot portion 78 extending from the splined end portion 76. The pilot portion 78 engages the pilot bearing 72 mounted in the pilot recess 70 of the output shaft 58 so as to allow independent rotation of the axle shaft 70 with respect to the output shaft 58 when rotational torque is interrupted therebetween, as well as to facilitate alignment and selective independent rotation between the axle shaft 60 and the output shaft 58, as noted above. The thrust portion 74 is configured to facilitate installation of the axle shaft 60 of the continuously-variable joint 46 into the disconnect assembly 50. To this end, a thrust bearing arrangement 80 is provided adjacent to the thrust portion 74 of the axle shaft 60 so as to facilitate axial movement of the axle shaft 60 during assembly, as well as to prevent axial binding when the clutch assembly 54 moves between configurations 54A, 54B, as described in greater detail below. In order to ensure long life of the thrust bearing arrangement 80, one or more seals 81 may be operatively attached to the disconnect housing 52 adjacent to the axle shaft 60 and/or the output shaft 58.

The thrust bearing arrangement 80 includes a needle bearing arrangement 82 and a thrust plate 84. The needle bearing arrangement 82 is supported within the disconnect housing 52 and engages the thrust portion 74 of the axle shaft 60. The splined end portion 76 of the axle shaft 60 cooperates with the thrust plate 84 and other components of the clutch assembly 54 so as to facilitate selective rotational torque interruption between the output shaft 58 and the axle shaft 60. To this end, the clutch assembly 54 includes a coupling member 86 that has an inner spline portion 88 and an outer portion 90. The splined end portion 76 of the axle shaft 60 engages in the inner spline portion 88 of the coupling member 86 of the clutch assembly 54 such that the axle shaft 60 and the coupling member 86 rotate together. The outer portion 90 of the coupling member 86 includes a thrust surface 92 which engages the thrust plate 84 of the thrust bearing arrangement 80 so as to prevent axial forces from binding the axle shaft 60 when the clutch assembly 54 moves between configurations 54A, 54B. The outer portion 90 of the coupling member 86 also includes a coupling toothed portion 94 spaced from the thrust surface 92, and an idler gap 96 defined between the thrust surface 92 and the coupling toothed portion 94. The coupling toothed portion 94 and the idler gap 96 of the coupling member 86 cooperate with the electromagnetic actuator 56 and clutch assembly 54 so as to facilitate selective rotational torque interruption between the output shaft 58 and the axle shaft 60, as described in greater detail below.

In the representative embodiment illustrated herein, the output shaft 58 of the driveline 12 is defined by the "differential side" components that rotate together; specifically, the support shaft portion 62, the toothed portion 64, and the mid shaft portion 66 of the output shaft 58. Likewise, the axle shaft 60 of the driveline 12 is defined by the "wheel side" components of the clutch assembly 54 and the continuously-variable joint 46 that rotate together; specifically, the coupling member 86 of the clutch assembly 54; and the thrust portion 74, the splined end portion 76, and the pilot portion 78 of the axle shaft 60. However, as noted above, the various components of the driveline 12, differential 34, and/or clutch assembly 54 could be designed, configured, arranged, supported, and/or defined differently without departing from the scope of the present invention.

As noted above, the clutch assembly 54 is adapted to selectively interrupt rotational torque between the output shaft 58 and the axle shaft 56. To that end, in one embodiment, the clutch assembly 54 includes a sleeve 98 that acts to couple the axle shaft 56 and the output shaft 58 when the clutch assembly 54 is in the engaged configuration 54A. The sleeve 98 is disposed in force translating relationship with the electromagnetic actuator 56 such that the sleeve 98 couples the toothed portion 64 of the output shaft 58 to the coupling toothed portion 94 of the coupling member 86 of the clutch assembly 54 in the engaged configuration 54A. To that end, the sleeve 98 includes a first sleeve tooth portion 100 and a second sleeve tooth portion 102. In this embodiment, the second sleeve tooth portion 102 engages the toothed portion 64 of the output shaft 58 when the clutch assembly 54 is in both configurations 54A, 54B (see FIGS. 2A-3B). The first sleeve tooth portion 100 engages the coupling toothed portion 94 of the coupling member 86 when the clutch assembly 54 is in the engaged configuration 54A (see FIGS. 2A and 3A), and the first sleeve tooth portion 100 and moves away from the coupling toothed portion 94 and into the idler gap 96 when the clutch assembly 54 is in the disengaged configuration 54B (see FIGS. 2B and 3B). Thus, the idler gap 96 of the coupling member 86 is sized to accommodate the first sleeve tooth portion 100 when the clutch assembly 54 is in the disengaged configuration 54B.

To facilitate moving the clutch assembly 54 between the configurations 54A, 54B, the electromagnetic actuator 56 moves the sleeve 98 away from the axle shaft 60. To that end, in one embodiment, the clutch assembly 54 further includes a fork 104 operatively attached to the electromagnetic actuator 56 and disposed in force translating relationship with the sleeve 98. Those having ordinary skill in the art will recognize the arrangement of the toothed portion 64 of the output shaft 58, the coupling toothed portion 94 of the coupling member 86, the first and second sleeve tooth portions 100, 102 of the sleeve 98, and the fork 104 as forming what is commonly referred to as a "dog clutch" clutch assembly 54, whereby the toothed portion 64 and the coupling toothed portion 94 have external teeth (not shown in detail, but generally known in the related art) that cooperate with internal teeth of the first and second sleeve tooth portions 100, 102 of the sleeve 98 (not shown in detail, but generally known in the related art) to facilitate selective rotational torque interruption. However, those having ordinary skill in the art will appreciate that the various components and structure of the clutch assembly 54, sleeve 98, and/or the shafts 58, 60 could be designed in a number of different ways and, thus, could include different components or structure configured in any suitable way, or could omit certain components or structure entirely, without departing from the scope of the present invention.

As noted above, the axle disconnect assembly 50 of the present invention includes an electromagnetic actuator 56 that cooperates with the clutch assembly 54 so as to facilitate selective interruption of rotational torque between the output shaft 58 and the axle shaft 60. It will be appreciated that the electromagnetic actuator 56 can be configured in a number of different ways, depending on the application. By way of non-limiting example, two different embodiments of the electromagnetic actuator 56 of the axle disconnect assembly 50 of the present invention are described herein. For the purposes of clarity and consistency, unless otherwise indicated, subsequent discussion of the electromagnetic actuator 56 will refer to features and components that are common between the embodiments. Additionally, the specific differences between the embodiments will be described in detail.

Referring now to FIGS. 2A-3B, the electromagnetic actuator 56 of the axle disconnect assembly 50 is adapted to selectively move the clutch assembly 54 between the configurations 54A, 54B. To that end, the electromagnetic actuator 56 includes a slider 106 that is selectively movable between a first stable position 106A and a second stable position 106B. Further, the electromagnetic actuator 56 is disposed in force translating relationship with the clutch assembly 54 such that movement of the slider 106 from one of the stable positions 106A to the other of the stable positions 106B causes corresponding movement of the clutch assembly 54 between the configurations 54A, 54B so as to selectively translate rotational torque between the output shaft 58 of the driveline 12 and the axle shaft 60 of the driveline 12, as discussed above. To that end, the slider 106 of the electromagnetic actuator 56 is disposed in force translating relationship with the fork 104 of the clutch assembly 54 which, in turn, is adapted to translate force to the sleeve 98 of the clutch assembly 54. In the representative embodiments illustrated herein, the fork 104 is slidably supported to a fork shaft 108 and slides therealong in response movement of the slider 106 between the stable positions 106A, 106B. However, as will be appreciated from the subsequent description of the electromagnetic actuator 56 below, the slider 106 could be configured or otherwise defined in a number of different ways without departing from the scope of the present invention. As such, the axle disconnect assembly 50 could be designed so as to translate force from the electromagnetic actuator 56 to the clutch assembly 54 without the use of a fork 104 without departing from the scope of the present invention.

In one embodiment, the electromagnetic actuator 56 of the axle disconnect assembly 50 includes an actuator housing 110 that supports the various components of the electromagnetic actuator 56 described in greater detail below. Here, the disconnect housing 52 of the axle disconnect assembly 50 supports the actuator housing 110 and the fork shaft 108. It will be appreciated that the electromagnetic actuator 56 could be operatively attached to and/or supported to the vehicle in a number of different ways and, thus, the actuator housing 110 and/or the disconnect housing 52 could be configured in any suitable way without departing from the scope of the present invention.

Figure 2A:
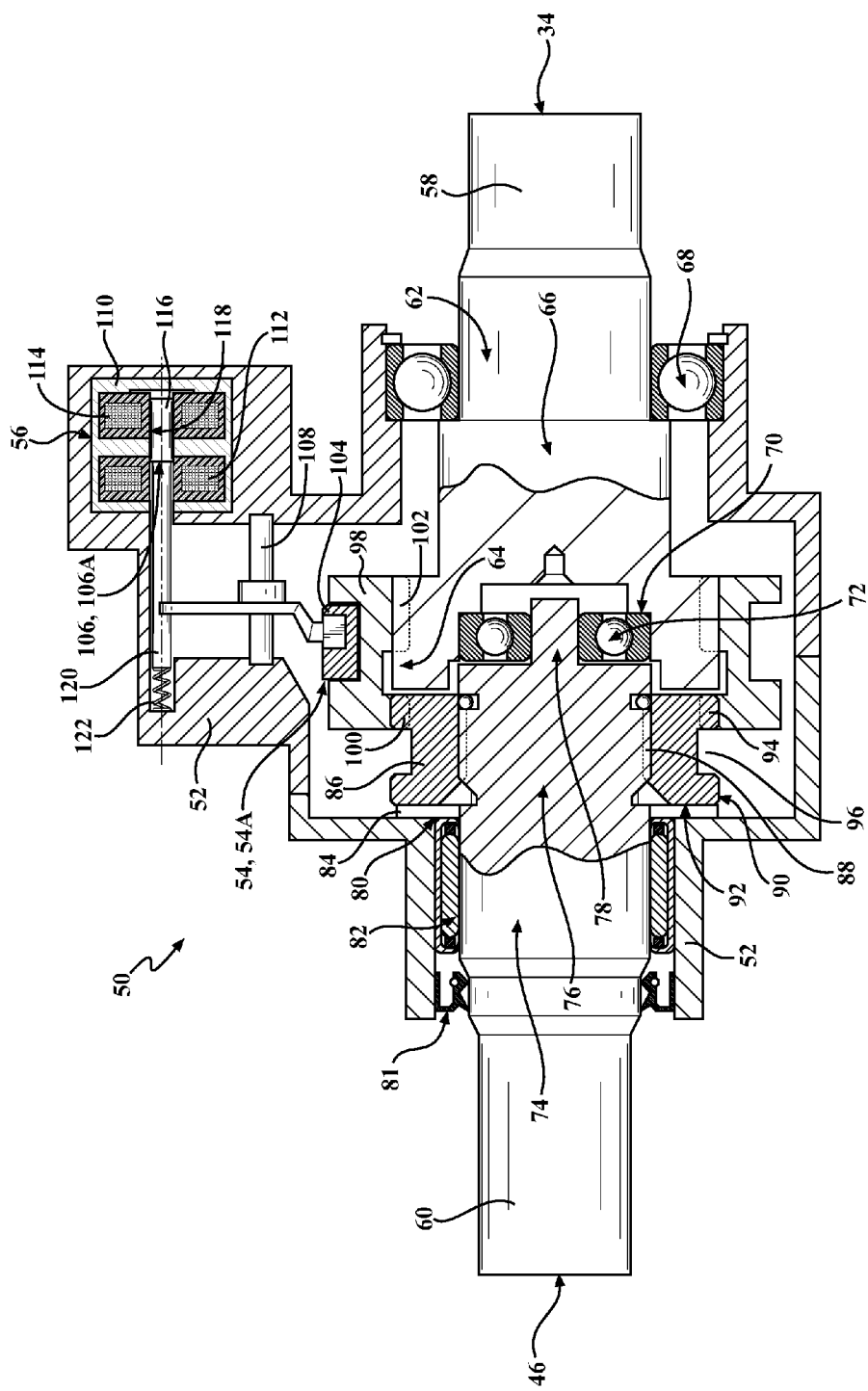
FIG. 2A is a sectional view of the shafts of FIG. 1 and a first embodiment of the axle disconnect assembly of the present invention shown in an engaged configuration.
Figure 2B:
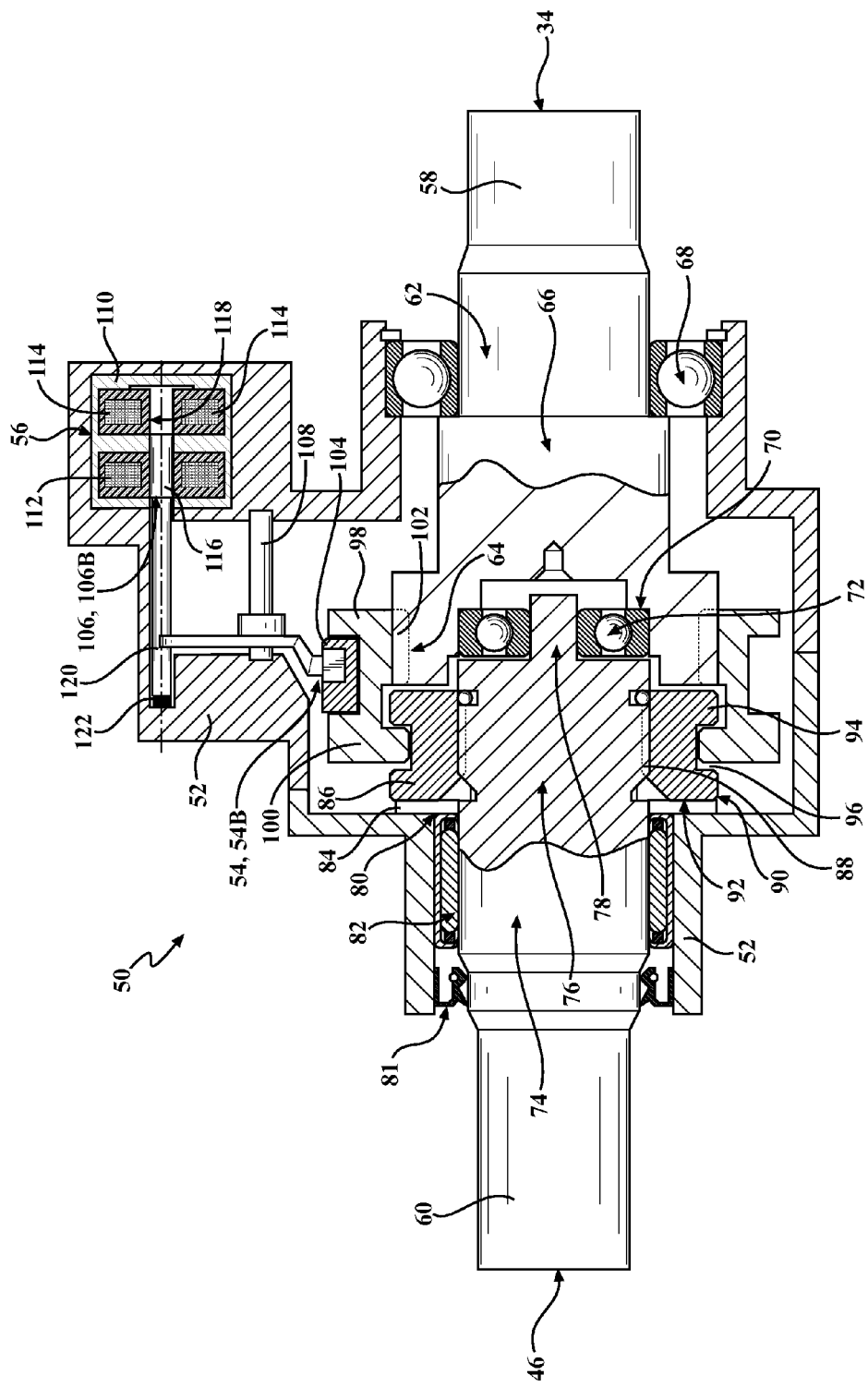
FIG. 2B is a sectional view of the shafts and the axle disconnect assembly of FIG. 2A shown in a disengaged configuration.

Referring now to FIGS. 2A-2B, a first embodiment of the electromagnetic actuator 56 of the axle disconnect assembly 50 is shown. In this embodiment, the electromagnetic actuator 56 includes a first coil 112, a second coil 114, and a permanent magnet 116. The first coil 112 acts to selectively generate a first magnetic field. The second coil 114 is spaced from the first coil 112 and acts to selectively generate a second magnetic field. The permanent magnet 116 is operatively attached to the slider 106 such that predetermined changes in the first magnetic field and/or the second magnetic field urge the slider 106 from one of the stable positions 106A (or, 106B) to the other stable position 106B (or, 106A). In this embodiment, the actuator housing 110 has a cylinder 118 defined therein that supports the slider 106, and the slider 106 is further defined as a shaft 120 supported in and movable along the cylinder 118 between the stable positions 106A, 106B. Thus, the permanent magnet 116 is operatively attached to the shaft 120 such that predetermined changes in the magnetic field generated by the coils 112, 114 urge the permanent magnet 116 and, thus, the shaft 120 along the cylinder 118, whereby the shaft 120 translates force to the fork 104 which, in turn, slides along the fork shaft 108 and translates force to the sleeve 98 so as to move the clutch assembly 54 between the configurations 54A, 54B, as descried above. In one embodiment, at least one spring 122 is interposed between the actuator housing 110 and the shaft 120. The spring 122 cooperates with the coils 112, 114 so as to urge the shaft 120 from one stable position 106A (or, 106B) to the other stable position 106B (or, 106A), as is described in greater detail below.

The second coil 114 is spaced from the first coil 112 such that the first magnetic field and/or the second magnetic field urges the slider 106 from one of the stable positions 106A to the other of the stable positions 106B so as to cause corresponding movement of the clutch assembly 54 between the configurations 54A, 54B, as noted above. In one embodiment, the first coil 112 and/or the second coil 114 are aligned with the slider 106. More specifically, in the embodiment illustrated in FIGS. 2A and 2B, both the first coil 112 and the second coil 114 are substantially aligned with the shaft 120, and the permanent magnet 116 is disposed between the first coil 112 and the second coil 114. However, those having ordinary skill in the art will appreciate that the permanent magnet 116 could be disposed in any suitable location sufficient to move the slider 106 between the stable positions 106A, 106B, without departing from the scope of the present invention. Moreover, those having ordinary skill in the art will appreciate that the first coil 112, the second coil 114, and/or the permanent magnet 116 could be configured, disposed, or otherwise arranged in any suitable way, with any suitable shape or profile, without departing from the scope of the present invention.

In the representative embodiment illustrated in FIGS. 2A and 2B, the permanent magnet 116 is operatively attached to the shaft 120 for concurrent movement between the stable positions 106A, 106B. Here, the permanent magnet 116 is a unitary, one-piece component and has a substantially annular profile. However, those having ordinary skill in the art will appreciate that the permanent magnet 116 could have any suitable configuration sufficient to cooperate with the first coil 112 and/or the second coil 114 so as to urge the slider 106 between the stable positions 106A, 106B without departing from the scope of the present invention.

In one embodiment, the controller 48 is disposed in electrical communication with the coils 112, 114 for selectively generating and/or reversing the polarity of the magnetic fields so as to move the slider 106 between the stable positions 106A, 106B. To that end, the controller 48 may be adapted to direct electrical charge through the coils 112, 114 such that the magnetic fields are induced by the flow of electrical charges in the coils 112, 114. Here, a change in the direction of the flow of electrical charges in the coils 112, 114 causes a corresponding reversal of the generated magnetic fields. Those having ordinary skill in the art will appreciate that the controller 48 can be adapted to selectively flow current through each coil 112, 114 either independently or simultaneously. Likewise, the controller 48 can be configured to selectively reverse current flow through each coil 112, 114 either independently or simultaneously. Further, it will be appreciated that the coils 112, 114 could be wound in opposite directions (for example, the first coil 112 could be wound clockwise and the second coil 114 could be wound counterclockwise) or, alternatively, both coils could be wound in the same direction (for example, both the first coil 112 and the second coil 114 could be wound clockwise). The controller 48, also commonly referred to in the related art as an "electronic control module" may also be employed so as to control the transfer case 26, as noted above.

As will be appreciated from the subsequent description below, the stable positions 106A, 106B are configured so as to allow the electromagnetic actuator 56 to maintain the selected clutch assembly 54 configuration 54A, 54B without necessitating that the first coil 112 or the second coil 114 be continuously energized. Those having ordinary skill in the art will recognize this as a so-called "bi-stable" electromagnetic actuator 56 configuration. Thus, the controller 48 could be configured so as momentarily direct electrical charges the first coil 112 and/or the second coil 114 until the clutch assembly 54 changes between configurations 54A, 54B, at which time the coil(s) 112, 114 could be subsequently de-energized. In particular, and because continuous application of electrical current is not required to hold the slider 106 in the stable positions 106A, 106B, the controller 48 could be configured to sense which of the stable positions 106A, 106B the slider 106 is in (and, thus, which of the configurations 54A, 54B the clutch assembly 54 is in), such as via measuring or otherwise determining inductance in the coil(s) 112, 114.

Figure 3A:
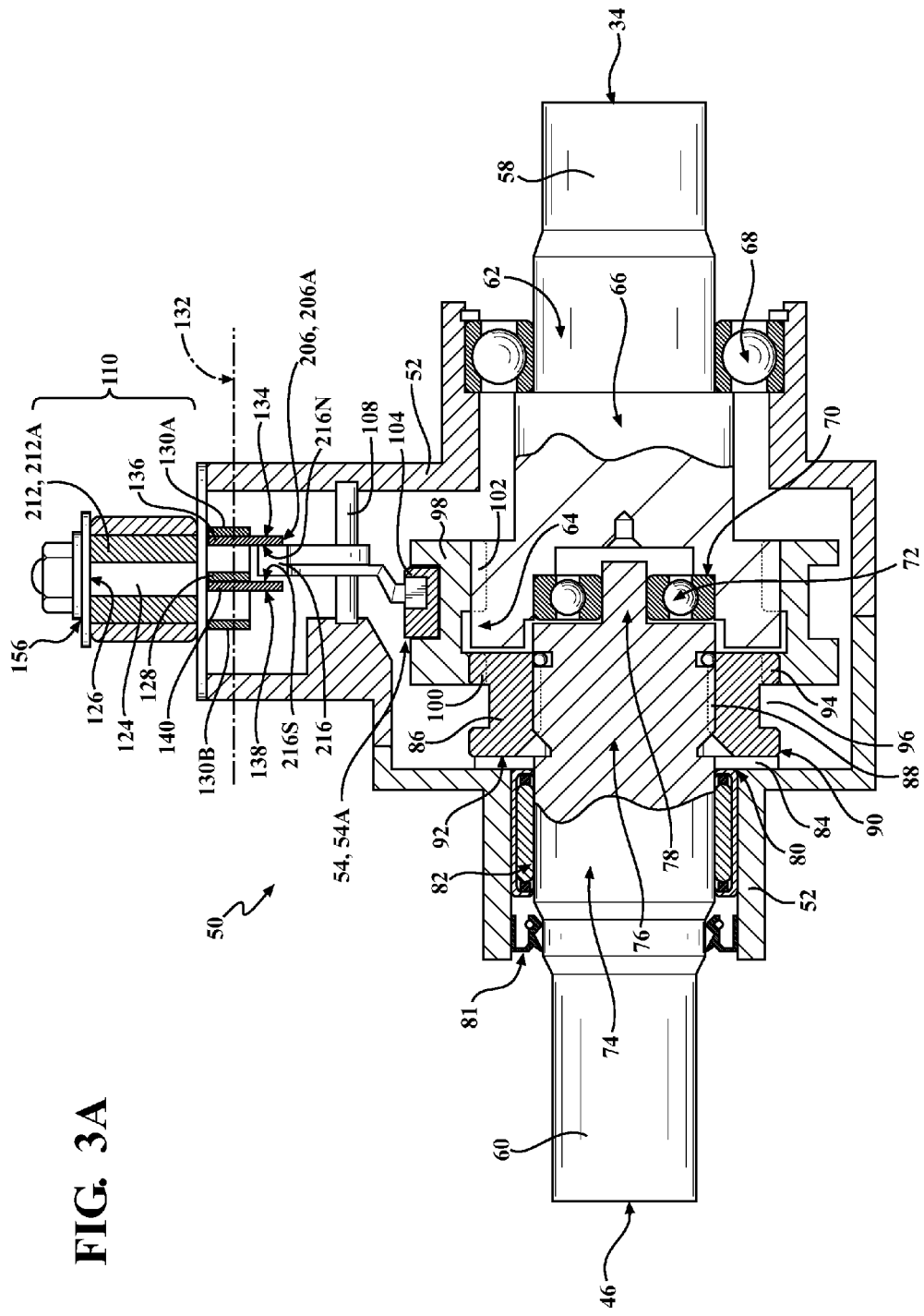
FIG. 3A is a sectional view of the shafts of FIG. 1 and a second embodiment of the axle disconnect assembly of the present invention shown in an engaged configuration.
Figure 3B:
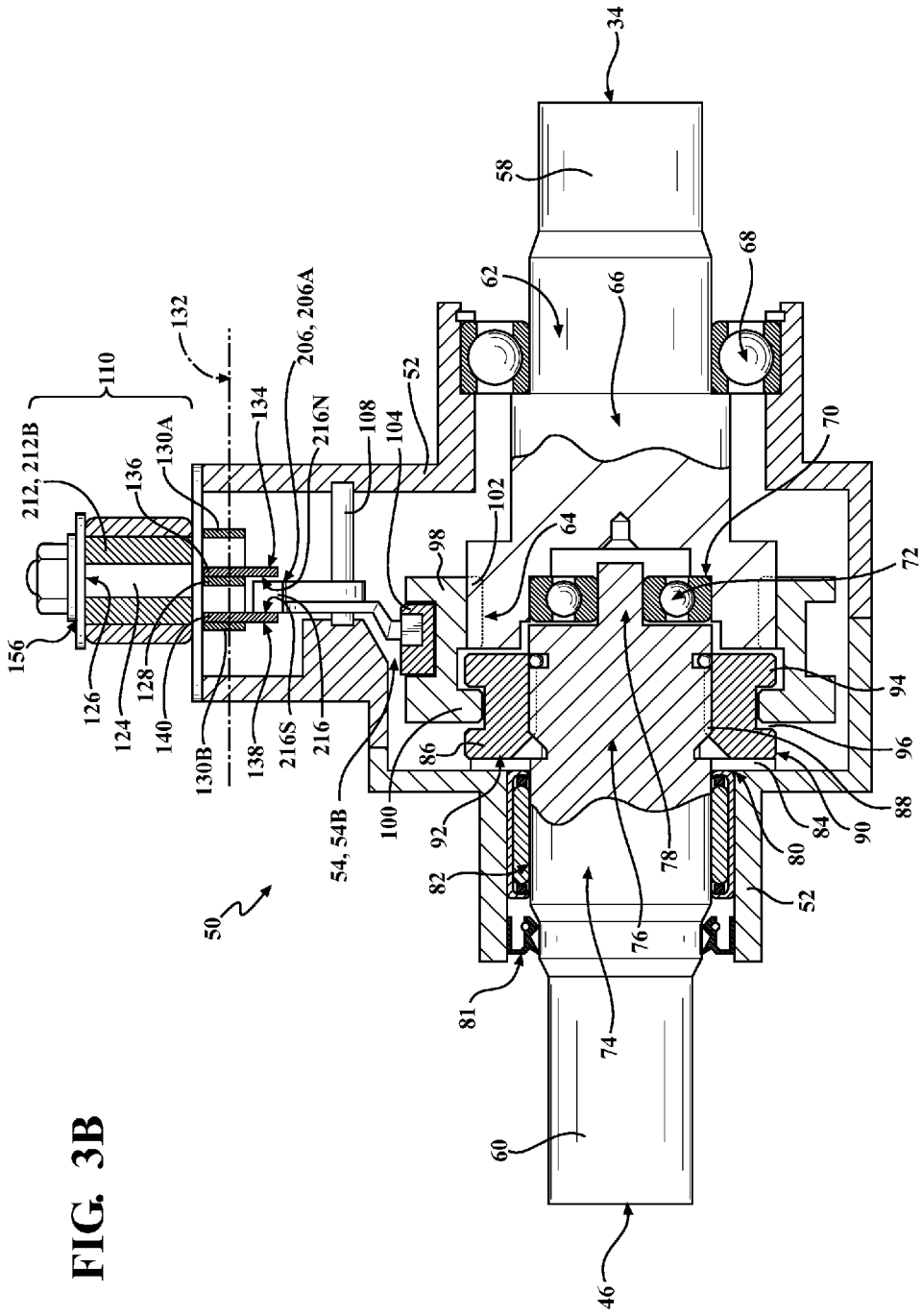
FIG. 3B is a sectional view of the shafts and the axle disconnect assembly of FIG. 3A shown in a disengaged configuration.

As noted above, a second embodiment of the electromagnetic actuator 56 of the axle disconnect assembly 50 of the present invention is shown in FIGS. 3A and 3B. In the description that follows, non-identical components of the second embodiment of the electromagnetic actuator 56 are provided with the same reference numerals used in connection with the first embodiment of the electromagnetic actuator 56 increased by 100.

Referring now to FIGS. 3A and 3B, the second embodiment of the electromagnetic actuator 156 of the axle disconnect assembly 50 of the present invention is shown. In this second embodiment, the electromagnetic actuator 156 includes a single coil 212 that acts to selectively generate a magnetic field. The permanent magnet 216 is likewise operatively attached to the slider 206 such that predetermined changes in the magnetic field generated by the single coil 212 urges the slider 206 from one of the stable positions 206A (or, 206B) to the other stable position 206B (or, 206A) so as to cause corresponding movement of the clutch assembly 54 between the configurations 54A, 54B. To that end, the controller 48 is disposed in electrical communication with the single coil 212 for selectively generating and/or reversing the polarity of the magnetic field, as discussed in greater detail above in connection with the first embodiment of the electromagnetic actuator 56. Likewise, the controller 48 can also be configured so as to determine the relative position of the slider 206 between the stable positions 206A, 206B based on inductance in the single coil 212.

In this embodiment, the electromagnetic actuator 156 further includes a core 124 having a first magnetic pole 126 and a second magnetic pole 128 spaced from the first magnetic pole. The core 124 is adapted to direct the magnetic field generated by the signal coil 212 to the first magnetic pole 126 and to the second magnetic pole 128. The first magnetic pole 126 includes a pair of first magnetic pole elements 130A, 130B spaced from each other along a common reference axis 132 (physical connection to first magnetic pole 126 not shown in detail). The second magnetic pole 128 is spaced between the first magnetic pole elements 130A, 130B along the common reference axis 132. In one embodiment, the permanent magnet 216 has opposing north and south ends 216N, 216S, and the electromagnetic actuator 156 further includes a north blade 134 with a north blade end 136, and a south blade 138 with a south blade end 140. The north blade 134 is operatively attached to the north end 216N of the permanent magnet 216 and extends to the north blade end 136. The north blade end 136 is disposed along the common reference axis 132 between the second magnetic pole 128 of the core 124, and one of the first magnetic pole elements 130A (or, 130B) of the core 124. The south blade 138 is operatively attached to the south end 216S of the permanent magnet 216 and extends to the south blade end 140. The south blade end 140 is disposed along the common reference axis 132 between the second magnetic pole 128 of the core 124, and the other of the first magnetic pole elements 130B (or, 130A) of the core 124. In this embodiment of the electromagnetic actuator 156 of the axle disconnect assembly 50 of the present invention, the magnetic field generated by the single coil 212 is selectively reversible between a first magnetic field orientation 212A and a second magnetic field orientation 212B. In the first magnetic field orientation 212A (see FIG. 3A), the first magnetic pole elements 130A, 130B of the core 124 attract the north blade end 136 and repel the south blade end 140; and the second magnetic pole 128 of the core 124 attracts the south blade end 140 and repels the north blade end 136, thereby urging the slider 106 to one of the stable positions 106A (or, 106B). In the second magnetic field orientation 212B (see FIG. 3B), the first magnetic pole elements 130A, 130B of the core 124 attract the south blade end 140 and repel the north blade end 120; and the second magnetic pole 128 of the core 124 attracts the north blade end 136 and repels the south blade end 140, thereby urging the slider 106 to the other of the stable positions 106B (or, 106A). In one embodiment, the north blade 134, the south blade 138, and/or the core 124 are manufactured from a ferrous material. However, those having ordinary skill in the art will appreciate that the various components of the electromagnetic actuator 156 could be designed, configured, and/or manufactured in any suitable way, and from any suitable material sufficient to translate force so as to move the slider 106 between the stable positions 106A, 106B so as to cause corresponding movement of the clutch assembly 54 between the configurations 54A, 54B, as discussed above.

In this way, the rotational axle disconnect assembly 50 of the present significantly improves the performance of vehicle powertrain systems 10 by enabling simple and space-efficient implementation of selective rotational torque interruption. More specifically, those having ordinary skill in the art will appreciate that the axle disconnect assembly 50 of the present invention is configured such that the clutch assembly 54 can remain in either configuration 54A, 54B without necessitating that the electromagnetic actuator 56, 156 be continuously supplied with electrical current. Moreover, it will be appreciated that the permanent magnet 116, 216 can be configured so as to significantly minimize the overall packaging size of the electromagnetic actuator 56, 156 and axle disconnect assembly 50. Further, the present invention can be used in connection with a number of different types of powertrain systems 10, in a number of different ways, and reduces the cost and complexity of manufacturing vehicles that have superior operational characteristics, such as high efficiency, reduced weight, component packaging, component life, and vehicle drivability.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An axle disconnect assembly for use in selectively translating rotational torque between an output shaft and an axle shaft of a vehicle driveline, with the output shaft and the axle shaft aligned about a shaft axis, said axle disconnect assembly comprising:
a disconnect housing;
a clutch assembly supported in said disconnect housing, disposed in selective torque translating relationship between the output shaft and the axle shaft, and movable between: an engaged configuration wherein rotational torque is translated between the output shaft and the axle shaft, and a disengaged configuration wherein rotational torque is interrupted between the output shaft and the axle shaft; and
an electromagnetic actuator having an actuator housing operatively attached to said disconnect housing with a cylinder formed in said actuator housing, a slider supported in said cylinder of said actuator housing, said slider being selectively movable within said cylinder between a first stable position and a second stable position, said actuator being disposed in force translating relationship with said clutch assembly such that movement of said slider within said cylinder from one of said stable positions to the other of said stable positions causes corresponding movement of said clutch assembly between said configurations so as to selectively translate rotational torque between the output shaft of the driveline and the axle shaft of the driveline,
and wherein said actuator includes a first coil that acts to selectively generate a first magnetic field, a second coil spaced from said first coil and acting to selectively generate a second magnetic field, and a permanent magnet operatively attached to said slider such that generation of either one of said first or second magnetic fields acts to move said permanent magnet and said slider between said first and second stable positions and such that said clutch is maintained in either of said engaged configuration or said disengaged configuration in the absence of said first and second magnetic fields, wherein said slider and said cylinder cooperate to define an axis that is eccentric from the shaft axis, wherein said slider is further defined as a shaft supported in and moveable along said cylinder between said stable positions, said shaft aligned concentrically with said axis, wherein said clutch assembly includes a sleeve disposed in force translating relationship with said shaft and acting to couple the output shaft and the axle shaft when said clutch assembly is in said engaged configuration, wherein the sleeve couples a toothed portion of the output shaft to a toothed portion of a coupling member of the clutch assembly, wherein the coupling member is connected to the axle shaft and wherein the coupling member has a gap formed therein, the sleeve comprising a first sleeve tooth constructed and arranged to be selectively moved into the gap formed in the coupling member when the clutch assembly is in a disengaged configuration.

2. The axle disconnect assembly as set forth in claim 1, further including a controller in electrical communication with said coils for selectively and independently generating said magnetic fields.

3. The axle disconnect assembly as set forth in claim 2, wherein said controller is adapted to determine a relative position of said slider between said stable positions based on inductance of said coils.

4. The axle disconnect assembly as set forth in claim 1, wherein said first coil and said second coil are aligned with said slider and said cylinder about said axis.

5. The axle disconnect assembly as set forth in claim 1, wherein said permanent magnet is disposed between said first coil and said second coil.

6. The axle disconnect assembly as set forth in claim 1, wherein said first coil is wound in a first direction, said second coil is wound in a second direction, and wherein said second direction is opposite to said first direction.

7. The axle disconnect assembly as set forth in claim 1, further including a controller in electrical communication with said coils for selectively and independently reversing polarity of said magnetic fields.

8. The axle disconnect assembly as set forth in claim 7, wherein said controller simultaneously generates said first magnetic field and said second magnetic field so as to urge said slider to one of said stable positions, and wherein said controller also simultaneously reverses the polarity of said first magnetic field and said second magnetic field so as to urge said slider to the other of said stable positions.

9. The axle disconnect assembly as set forth in claim 2, wherein said controller generates said first magnetic field so as to urge said slider to one of said stable positions, and wherein said controller generates said second magnetic field so as to urge said slider to the other of said stable positions.

10. The axle disconnect assembly as set forth in claim 1, wherein said first coil and said second coil are concentrically aligned with said permanent magnet about said axis.

11. An axle disconnect assembly as set forth in claim 1 wherein the permanent magnet is constructed and arranged to slide in the cylinder in formed in said actuator housing.

12. An axle disconnect assembly as set forth in claim 1 wherein the slider has a first and second end and wherein the permanent magnet is attached to one of the first or second ends of the slider.

13. An axle disconnect assembly as set forth in claim 1 further comprising a fork attached to the slider, the fork being constructed and arranged in a force translating relationship between said slider and said clutch assembly for moving said clutch assembly between said configurations in response to movement of said slider between said stable positions.

14. An axle disconnect assembly for use in selectively translating rotational torque between an output shaft and an axle shaft of a vehicle driveline, with the output shaft and the axle shaft aligned about a shaft axis, said axle disconnect assembly comprising:
a disconnect housing;
a clutch assembly supported in said disconnect housing, disposed in selective torque translating relationship between the output shaft and the axle shaft, and movable between: an engaged configuration wherein rotational torque is translated between the output shaft and the axle shaft, and a disengaged configuration wherein rotational torque is interrupted between the output shaft and the axle shaft; and
an electromagnetic actuator having an actuator housing operatively attached to said disconnect housing with a cylinder formed in said actuator housing, a slider supported in said cylinder of said actuator housing, said slider and said cylinder cooperating to define an axis from the shaft axis, said slider being selectively movable within said cylinder between a first stable position and a second stable position, said actuator being disposed in force translating relationship with said clutch assembly such that movement of said slider within said cylinder from one of said stable positions to the other of said stable positions causes corresponding movement of said clutch assembly between said configurations so as to selectively translate rotational torque between the output shaft of the driveline and the axle shaft of the driveline, and wherein said actuator includes a first coil that acts to selectively generate a first magnetic field, a second coil spaced from said first coil and acting to selectively generate a second magnetic field, and a permanent magnet operatively attached to said slider such that generation of either one of said first or second magnetic fields acts to move said permanent magnet and said slider between said first and second stable positions and such that said clutch is maintained in either of said engaged configuration or said disengaged configuration in the absence of said first and second magnetic fields, further including: a fork shaft operatively attached to said actuator housing spaced between said cylinder and the shaft axis; and a fork slidably supported along said fork shaft and interposed in force translating relationship between said slider and said clutch assembly for moving said clutch assembly between said configurations in response to movement of said slider between said stable positions.

15. An axle disconnect assembly for use in a vehicle driveline comprising:

an output shaft for providing a source of rotational torque;

an axle shaft spaced from said output shaft and coupled to a wheel, with said axle shaft and said output shaft aligned about a shaft axis;

a disconnect housing;

a clutch assembly supported in said disconnect housing, disposed in selective torque translating relationship between said output shaft and said axle shaft, and movable between: an engaged configuration wherein rotational torque is translated between said output shaft and said axle shaft, and a disengaged configuration wherein rotational torque is interrupted between said output shaft and said axle shaft; and an electromagnetic actuator having an actuator housing operatively attached to said disconnect housing with a cylinder formed in said actuator housing, a slider supported in said cylinder of said actuator housing, said slider and said cylinder cooperating to define an axis that is eccentric from said shaft axis, said slider being selectively movable within said cylinder between a first stable position and a second stable position, said actuator being disposed in force translating relationship with said clutch assembly such that movement of said slider within said cylinder from one of said stable positions to the other of said stable positions causes corresponding movement of said clutch assembly between said configurations so as to selectively translate rotational torque between said output shaft and said axle shaft, and wherein said actuator includes a first coil that acts to selectively generate a first magnetic field, a second coil spaced from said first coil and acting to selectively generate a second magnetic field, and a permanent magnet operatively attached to said slider such that generation of either one of said first or second magnetic fields acts to move said permanent magnet and said slider between said first and second stable positions and such that said clutch is maintained in either of said engaged configuration or said disengaged configuration in the absence of said first and second magnetic fields, further including:

a fork shaft operatively attached to said actuator housing spaced between said cylinder and said shaft axis; and a fork slidably supported along said fork shaft and interposed in force translating relationship between said slider and said clutch assembly for moving said clutch assembly between said configurations in response to movement of said slider along said cylinder axis between said stable positions.

16. An axle disconnect assembly for use in selectively translating rotational torque between an output shaft and an axle shaft of a vehicle driveline, with the output shaft and the axle shaft aligned about a shaft axis, said axle disconnect assembly comprising:

a disconnect housing;

a clutch assembly supported in said disconnect housing, disposed in selective torque translating relationship between the output shaft and the axle shaft, and movable between: an engaged configuration wherein rotational torque is translated between the output shaft and the axle shaft, and a disengaged configuration wherein rotational torque is interrupted between the output shaft and the axle shaft; and an electromagnetic actuator having an actuator housing operatively attached to said disconnect housing with a cylinder formed in said actuator housing, a slider supported in said cylinder of said actuator housing, said slider being selectively movable within said cylinder between a first stable position and a second stable position, said actuator being disposed in force translating relationship with said clutch assembly such that movement of said slider within said cylinder from one of said stable positions to the other of said stable positions causes corresponding movement of said clutch assembly between said configurations so as to selectively translate rotational torque between the output shaft of the driveline and the axle shaft of the driveline, and wherein said actuator includes a first coil that acts to selectively generate a first magnetic field, a second coil spaced from said first coil and acting to selectively generate a second magnetic field, and a permanent magnet operatively attached to said slider such that generation of either one of said first or second magnetic fields acts to move said permanent magnet and said slider between said first and second stable positions and such that said clutch is maintained in either of said engaged configuration or said disengaged configuration in the absence of said first and second magnetic fields, and further comprising a fork attached to the slider, the fork being constructed and arranged in a force translating relationship between said slider and said clutch assembly for moving said clutch assembly between said configurations in response to movement of said slider between said stable positions.

\* \* \* \* \*